(12) United States Patent
Onthank et al.

(10) Patent No.: US 10,455,813 B2
(45) Date of Patent: Oct. 29, 2019

(54) HANDGRIP FOR A LEASH

(71) Applicant: Nano Pet Products, LLC, Norwalk, CT (US)

(72) Inventors: Christopher Howse Onthank, Wilton, CT (US); Rutger Dave van Overbeek, Amersfoort (NL)

(73) Assignee: Nano Pet Products LLC, Norwalk, CT (US)

( * ) Notice: Subject to any disclaimer, the term of this patent is extended or adjusted under 35 U.S.C. 154(b) by 489 days.

(21) Appl. No.: 15/350,986

(22) Filed: Nov. 14, 2016

(65) Prior Publication Data

US 2017/0135319 A1 May 18, 2017

(30) Foreign Application Priority Data

Nov. 13, 2015 (NL) ..................... 2015789

(51) Int. Cl.
*A01K 27/00* (2006.01)

(52) U.S. Cl.
CPC .......... *A01K 27/005* (2013.01); *A01K 27/003* (2013.01); *A01K 27/006* (2013.01)

(58) Field of Classification Search
CPC .... A01K 27/003; A01K 27/00; A01K 27/005; A01K 27/006
USPC .......... 119/795, 787, 791, 784, 769
See application file for complete search history.

(56) References Cited

U.S. PATENT DOCUMENTS

| | | | |
|---|---|---|---|
| 760,171 A | 5/1904 | Atwell | |
| 865,094 A | 9/1907 | Fields | |
| 4,501,230 A | 2/1985 | Talo | |
| 4,541,364 A | 9/1985 | Contello | |
| 4,791,886 A * | 12/1988 | Anderson | A01K 1/04 119/771 |
| 4,947,801 A * | 8/1990 | Glass | A01K 1/0272 119/771 |
| 5,003,929 A * | 4/1991 | Dean | A01K 27/005 119/784 |
| 5,852,988 A | 12/1998 | Gish | |
| 5,887,550 A | 3/1999 | Levine et al. | |
| 6,273,029 B1 | 8/2001 | Gish | |
| 6,530,345 B2 | 3/2003 | Donze | |
| 6,948,218 B1 | 9/2005 | Donze | |
| 7,389,750 B1 | 6/2008 | Rogers et al. | |
| 7,467,604 B1 * | 12/2008 | Werner | A01K 27/00 119/770 |
| 7,757,639 B1 | 7/2010 | Prendes | |
| 8,100,445 B1 | 1/2012 | Brar | |
| 8,573,160 B1 | 11/2013 | Knight | |
| 8,875,353 B2 | 11/2014 | Miron | |
| 8,955,465 B1 | 2/2015 | Vandommelen | |
| 2002/0179023 A1 | 12/2002 | Axel | |
| 2005/0263103 A1 | 12/2005 | Updyke et al. | |

(Continued)

FOREIGN PATENT DOCUMENTS

| | | |
|---|---|---|
| DE | 20216878 | 3/2004 |
| GB | 1131886 | 10/1968 |
| WO | 2013/177681 | 12/2013 |

Primary Examiner — Yvonne R Abbott-Lewis
(74) Attorney, Agent, or Firm — Peacock Law P.C.; Janeen Vilven

(57) ABSTRACT

A handgrip for a leash, comprising a body with a grip part for holding the handgrip wherein the handgrip is embodied for connecting the leash. The handgrip comprises a guiding rail for slidingly coupling the leash along a displacement path.

20 Claims, 4 Drawing Sheets

(56) References Cited

U.S. PATENT DOCUMENTS

| | | |
|---|---|---|
| 2005/0264016 A1 | 12/2005 | Davis |
| 2006/0065210 A1 | 3/2006 | Tozawa |
| 2006/0272595 A1 | 12/2006 | Edwards |
| 2008/0173257 A1 | 7/2008 | Steiner et al. |
| 2008/0216767 A1 | 9/2008 | Wang |
| 2009/0283055 A1* | 11/2009 | Laske .................. A01K 27/003 119/796 |
| 2011/0197820 A1 | 8/2011 | Goldy |
| 2012/0006284 A1 | 1/2012 | Messner |
| 2012/0098281 A1 | 4/2012 | Sigmund |
| 2013/0133593 A1 | 5/2013 | Church |
| 2014/0283759 A1 | 9/2014 | Bianchi |
| 2015/0090196 A1 | 4/2015 | Fleming et al. |
| 2015/0107532 A1 | 4/2015 | Shaver et al. |
| 2015/0245594 A1 | 9/2015 | Bernard |
| 2015/0282456 A1 | 10/2015 | Harley |
| 2017/0037589 A1 | 2/2017 | Rivadeneira |
| 2017/0181406 A1 | 6/2017 | Onthank et al. |
| 2017/0268565 A1* | 9/2017 | Onthank .............. A01K 27/005 |
| 2017/0360007 A1* | 12/2017 | Wu ...................... A01K 27/004 |

\* cited by examiner

HANDGRIP FOR A LEASH

CROSS-REFERENCE TO RELATED APPLICATIONS

This application claims priority to and the benefit of the filing of Netherlands Patent Application No. 2015789, filed on Nov. 13, 2015, and the specification and claims thereof are incorporated herein by reference.

STATEMENT REGARDING FEDERALLY SPONSORED RESEARCH OR DEVELOPMENT

Not Applicable.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to a handgrip for a leash.

Description of Related Art Including Information Disclosed Under 37 C.F.R. §§ 1.97 and 1.98

Grips are known that contain a retractable reel for connecting a dog leash. Such handgrip has the disadvantage that the leash itself is rigidly connected to the handgrip, at a relatively large distance from the user's hand holding the device, with the consequence that the user experiences large forces on his hand and wrist when the dog pulls hard on the leash. Such is obtained especially when the dog runs back and forth. For, when the pet is quietly walking along (non-pull scenario), the user will have is arm stretched vertically along his body. When the pet runs away (pull scenario), the handgrip will be rotated yielding pulling forces into his pink.

Also, since the point pressure on one's hand is even relatively high when holding the handgrip in the non-pull scenario, which is even more profound when the handgrip is (suddenly) pulled back and forth in the pull scenario, the use of such handgrip is very uncomfortable. This disadvantage applies to regular leashes as well.

In the art, no solution is available for this disadvantage. As a matter of fact, the retractable leash can be set to a fixed short length limiting the pet's radius of action, but the disadvantage with respect to the angle from the user's hand to the coupling with the leash remains inconvenient, creating undesired point pressure on smaller parts of the hand in either one or both of the pull and non-pull scenario.

Another disadvantage is that in the art there is no safe handgrip solution available for comfortably holding or connecting a regular, non-retractable leash to a handgrip for guiding a pet, with which pressure in pull and non-pull scenario is distributed over a larger part of one's hand in both pull and non-pull scenario.

BRIEF SUMMARY OF THE INVENTION

The invention therefore aims at providing an improved hand-grip of the kind mentioned in the preamble.

The invention especially aims at providing a handgrip that lessens forces exerted on hand and wrist.

The invention furthermore aims at providing a handgrip that enables one to have a pet run back and forth without the handgrip being twisted around.

So as to reach at least one of the above mentioned aims, the invention provides a handgrip comprising the features of claim 1. This handgrip provides the advantage that the handgrip may be held in the hand whereas the leash has sufficient freedom of movement such that the position of the handgrip and one's hand remains the same, independent the position of the pet, for example but not limited to a dog, pulling on the leash. Also, any movement of the leash is not forwarded directly to one's hand providing an experience of ease to a user.

Further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
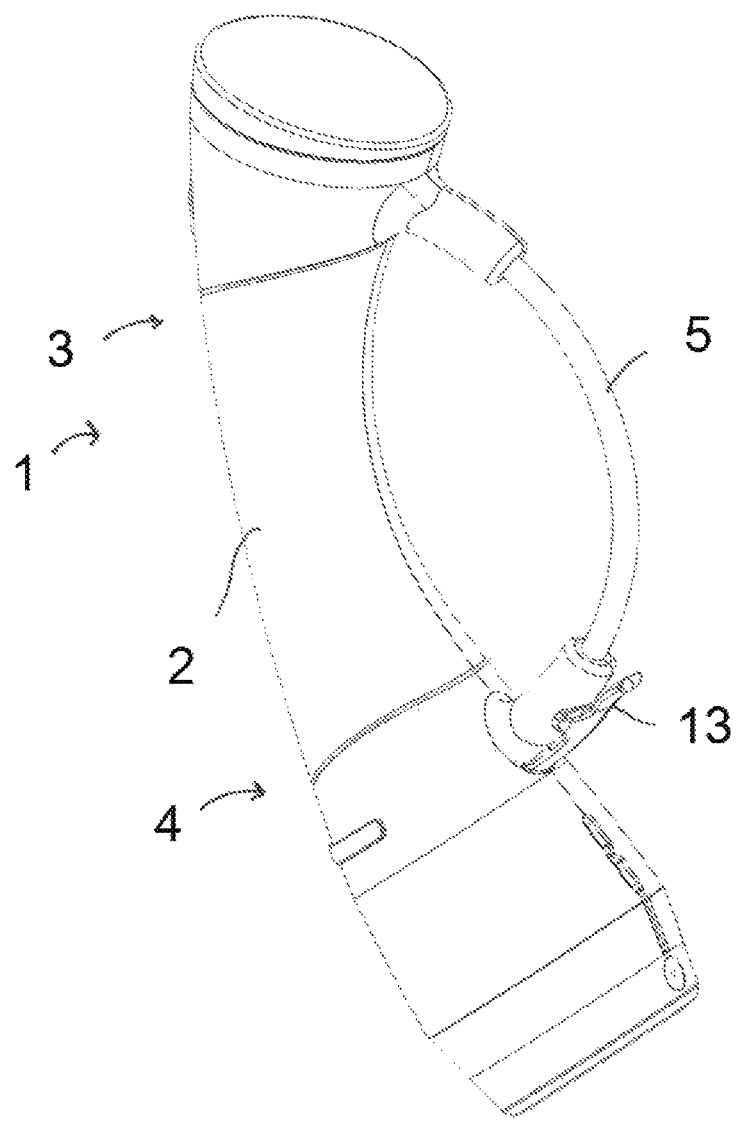
FIG. 1 is a schematic perspective view of a handgrip according to the invention.

The invention therefore relates to a handgrip for a leash, comprising a body with a grip part for holding said handgrip wherein said handgrip is embodied for connecting said leash, said handgrip being characterized in that it comprises a guiding rail for slidingly coupling said leash along a displacement path.

According to a preferred embodiment the guiding rail is embodied for slidingly guiding said leash at a distance from and along the handgrip. This enables one to easily hold the handgrip whereas the leash is guided over one's hand, such that a comfortable grip is obtained.

An easy way of connecting a leash to the handgrip in combination with a uniform guidance of said leash along said guiding rail is obtained when said guiding rail is provided with a connector for coupling said leash. Hereafter, the term traveler will be used along the term connector. In both circumstances, a material part is meant that on the one hand is guided along said guiding rail and on the other hand is coupled to the leash. This may be comprised of a single material part or of a combination of material parts. In the latter case, it may comprise a traveler that is guided along the guiding rail and a connector for holding the leash. The connector is preferably rotatably coupled to said traveler. As a consequence, the end of the leash positioned furthest away from the pet can slide along said guiding rail such that it is not positioned at a constant fixed position with respect to the person's hand carrying the handgrip.

According to a further preferred embodiment, the guiding rail is connected to said handgrip, said guiding rail being connected to the handgrip at at least one position, for example at a single position. However, it is preferred for the guiding rail to be connected to the handgrip at at least two positions, for example at both ends of said guiding rail. Preferably, a first end of said guiding rail being connected near a first side of said grip part and a second end of said guiding rail being connected near a second side of said grip part. Such provides an easy technical solution for a configuration wherein the leash is guided over the fingers, knuckles or dorsum of the hand of a user.

An easy way of guiding the leash evenly along the guiding rail, is obtained by a handgrip wherein said guiding rail has a curved shape such that at a position in between ends thereof it is at a larger distance from said handgrip then at said ends.

A handgrip wherein a preferred position of keeping the leash is positioned in between ends of said guiding rail is obtained if said guiding rail is spirally wound at a position in between said ends, such that a substantial part of said spiral is at a larger distance from said handgrip than neighboring parts of said guiding rail. Such holds the leash at a preferred position at said spirally wound part of the guiding rail. However, the leash keeps freedom to travel along the guiding rail to each of said end positions.

An alternative embodiment is obtained if said guiding rail comprises a first end and a second end, a declension being provided at a position in between both said ends, said declension substantially being directed away from said grip part. Such embodiment also ensures that the leash will be kept at a preferred position at said declension. However, the leash keeps freedom to travel along the guiding rail to each of said end positions.

A simple handgrip is obtained when said guiding rail is comprised of a single material part. This provides high strength and stability to said guiding rail. However, according to another embodiment, said guiding rail may be manufactured from two mutually connectable parts, which eases manufacture and keeps production costs low.

An alternative embodiment is comprised of a handgrip wherein said guiding rail is at least partially comprised of a longitudinal element comprising two substantially parallel elements, a connector (or traveler as mentioned before) for coupling a leash being slidingly engaged between said substantially parallel elements. This provides a visually appealing embodiment, whereas the mutual orientation of said substantially parallel elements may provide an additional benefit in forcing the connector into a preferred orientation with respect to the handgrip, such that the connector at a first end position is in a different orientation (for example, mainly positioned above any of the fingers, knuckles or dorsum) than at a second end position (for example, mainly positioned above another of the fingers, knuckles or dorsum).

An especially nice behavior is obtained when said handgrip comprises a shock absorber for said leash or said connector ("traveler") when same reaches an end position of said displacement path. The forces exerted on the handgrip by a pet moving back and forth, pulling on the leash, then are rarely experienced by the user holding the handgrip.

In such embodiment, it is especially preferred for said guiding rail to comprise shock absorbers at respective end positions of said displacement path.

In the handgrip comprising a connector, it is preferred that said connector comprises a traveler that is slidingly connected to said guiding rail, said traveler comprising a releasable connector for connecting said leash. This enables one to easily connect a regular leash to the handgrip according to the present invention. Any leash a pet is used to, therefore can be used in combination with the handgrip according to the present invention. According to a preferred embodiment, the releasable connector is coupled pivotably and/or rotatably to the connector providing additional freedom of movement to the leash with respect to the handgrip, adding to the experience of ease.

A very easy way of coupling a leash to the handgrip according to the invention is obtained if said releasable connector comprises a carabiner for connecting said leash.

A handgrip comprising a connector, for example a carabiner, provides the advantage that a leash can be connected to the hand-grip. The user's other hand is free for holding something else, like a kid's hand or a telephone.

A combination of a couple of leashes, for example when walking more than one pet, coupled to a single handgrip may be easily obtained if said releasable connector is embodied for coupling at least one other releasable connector thereto for coupling another leash. As a result a virtually unlimited number of connectors may be coupled to a handgrip according to the present invention.

In the figures, the same and similar parts are identified and denoted by the same reference numerals. However, for ease of understanding the invention, not all parts that are necessary for a practical embodiment are shown in the drawing. The drawings only show schematic embodiments. Reference will be made mainly to a handgrip for walking a dog on a leash, although the invention is not limited to dogs. A leash for any pet can be connected to the handgrip according to the present invention.

Figure 2:
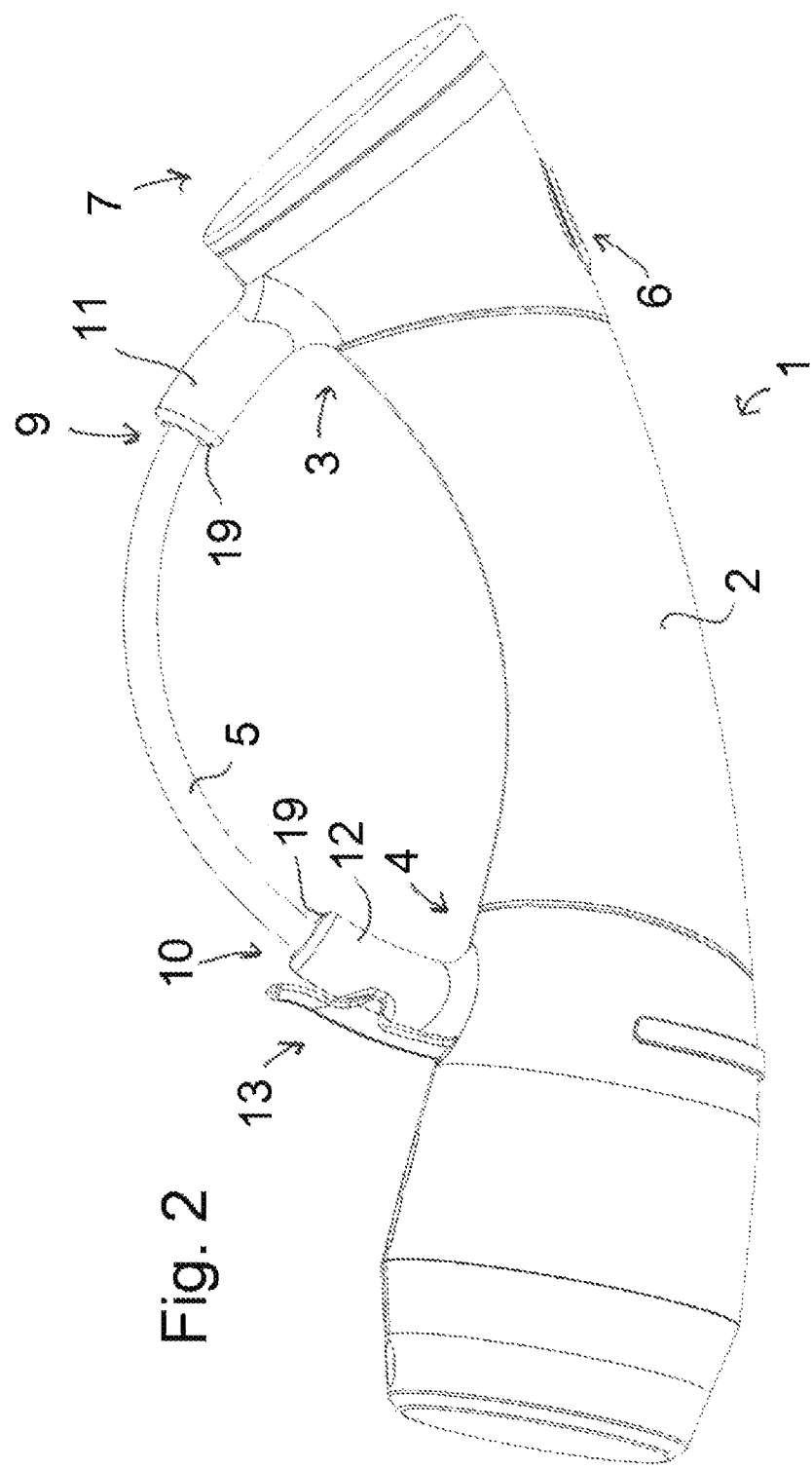
FIG. 2 is a schematic side view of the handgrip according to FIG. 1.

FIG. 1 and FIG. 2 show a perspective view of a handgrip 1 according to the present invention. The handgrip 1 comprises a grip part 2 to be held by the hand of a user. For example, the thumb part of a hand may be positioned near a first end 3 of said grip part 2, whereas the pink of the hand of said user may be positioned near a second end 4 of said grip part 2. The fingers or knuckles of the hand may be positioned between the grip part 2 and a guiding rail 5. This allows one to easily control a button 6, for example for controlling a flash light of a clicker, provided at an end part 7 of said handgrip 1. The other end 8 of said handgrip 1 may comprise a light as well or any other item as desired by a user.

The guiding rail 5 may be provided with a connector 14 that is slidingly coupled to said guiding rail 5. The connector 14 may travel between two end positions 9,10 of said guiding rail 5. Hence, a leash that is coupled to said connector may travel between said end positions 9,10 as well.

When the connector travels hence and forth, it may contact the connection parts 11,12 near said respective end positions 9,10, inducing nuisance to the user. To that end, said guiding rails 5 may be provided with shock absorbers 19.

FIG. 2 shows another perspective view of the handgrip 1 according to the invention. A clip 13 is shown for holding a poop bag, for example.

Figure 3:
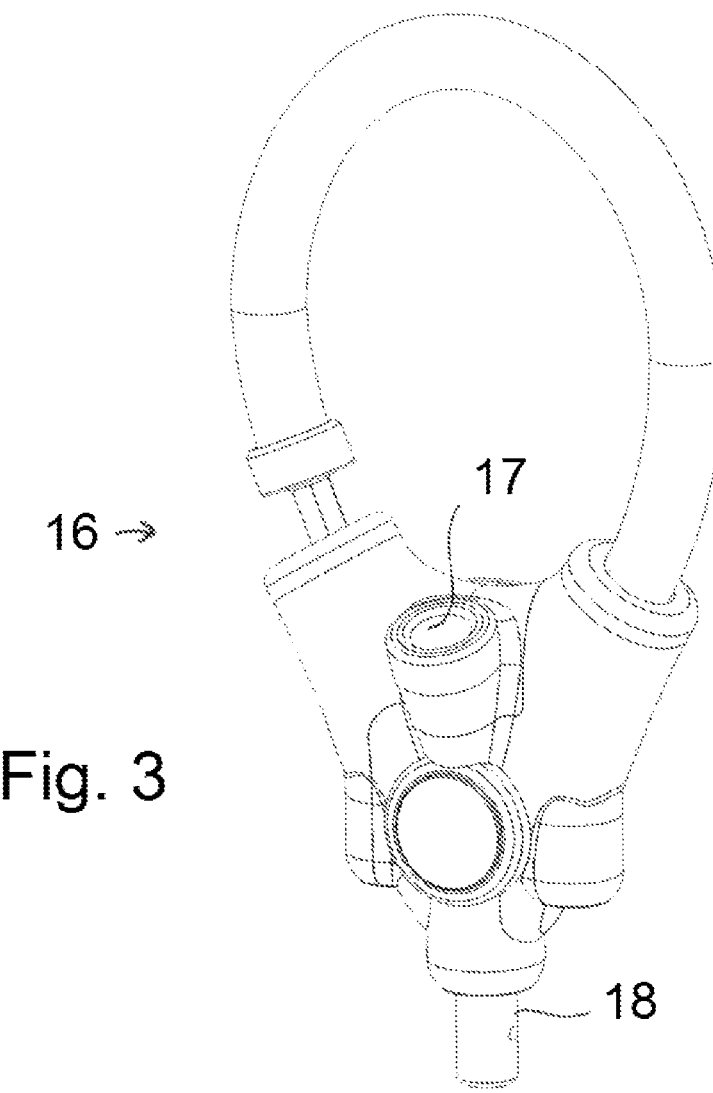
FIG. 3 shows a carabiner for coupling a leash according to the invention.

FIG. 3 shows a carabiner 16 for coupling a leash. Said carabiner 16 may be coupled to a connector 14 for coupling to the handgrip 1, as shown in FIG. 4.

The connector 14 is to be coupled to the guiding rail 5, wherein the guiding rail 5 is led through the hole 15 in said connector 14. To said connector 14 a carabiner 16 is coupled. Said carabiner 16 is embodied for coupling a leash. The connector 14 may travel along said guiding rail 5 from first end 9 to second end 10 and back.

Figure 4:
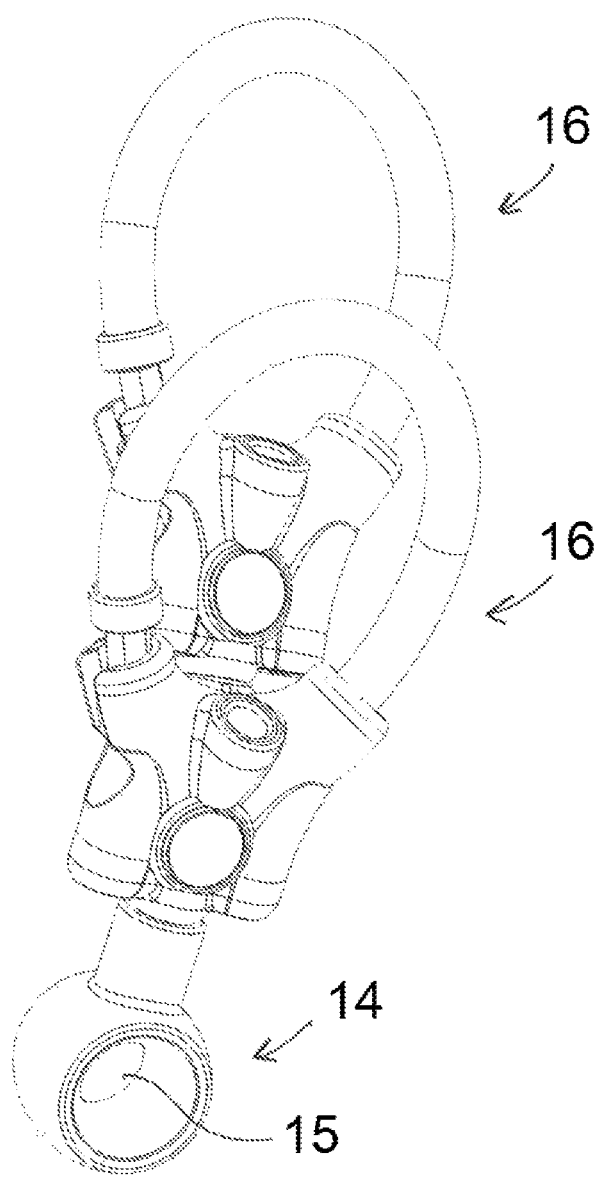
FIG. 4 shows the carabiner of FIG. 3 coupled to a connector for coupling to the handgrip.

As shown in FIG. 4, the carabiners 16 may be stacked so as to be able to connect a plurality of leashes independently to a carabiner 16. To that end, female connecting holes 17 are provided in each carabiner 16 for receiving a male connecting boss 18.

The invention is not limited to the embodiments as mentioned above and as shown in the drawing. The invention is limited only by the appending claims.

The invention also embodied all combination of features that have been described independently of each other.

What is claimed is:

1. A handgrip for a leash, comprising a body with a grip part for holding said handgrip wherein said handgrip is embodied for connecting said leash, wherein said handgrip comprises a guiding rail for slidingly coupling said leash along a displacement path.

2. The handgrip for a leash according to claim 1, wherein said guiding rail is embodied for slidingly guiding said leash at a distance from and along the handgrip.

3. The handgrip for a leash according to claim 1, wherein said guiding rail is provided with a connector for coupling said leash.

4. The handgrip for a leash according to claim 3, a traveler being slidingly connected to said guiding rail, said traveler comprising a connector for connecting said leash, wherein said connector preferably is a releasable connector.

5. The handgrip for a leash according to claim 4, said releasable connector comprising a carabiner for connecting said leash.

6. The handgrip for a leash according to claim 4, said releasable connector being embodied for coupling at least one other releasable connector thereto for coupling another leash, at least one connector being rotatably coupled to said traveler.

7. The handgrip for a leash according to claim 4, wherein said connector is rotatably connected to said traveler.

8. The handgrip for a leash according to claim 1, wherein said guiding rail is connected to said handgrip, a first end of said guiding rail being connected near a first side of said grip part and a second end of said guiding rail being connected near a second side of said grip part.

9. The handgrip for a leash according to claim 1, wherein said guiding rail has a curved shape such that at a position in between ends thereof it is at a larger distance from said handgrip then at said ends.

10. The handgrip for a leash according to claim 1, wherein said guiding rail is spirally wound at a position in between said ends, such that a substantial part of said spiral is at a larger distance from said handgrip than neighboring parts of said guiding rail.

11. The handgrip for a leash according to claim 1, wherein said guiding rail is comprised of a single material part.

12. The handgrip for a leash according to claim 1, wherein said guiding rail is at least partially comprised of a longitudinal element comprising two substantially parallel elements, a connector for coupling a leash being slidingly engaged between said substantially parallel elements.

13. The handgrip for a leash according to claim 1, said handgrip comprising a shock absorber for said leash or said connector when same reaches an end position of said displacement path.

14. The handgrip for a leash according to claim 13, wherein said guiding rail comprises shock absorbers at respective end positions of said displacement path.

15. The handgrip for a leash according to claim 1, said handgrip comprising a compressible material, preferably a silicone material.

16. The handgrip for a leash according to claim 15, said compressible material comprising a silicone material.

17. The handgrip for a leash according to claim 1, wherein said re-leasable connector comprises a safety latch for automatic release of said leash upon exceeding a predetermined pulling force.

18. The handgrip for a leash according to claim 1, wherein the body of said handgrip has a substantially bent shape and wherein said central portion of said body has a smaller diameter than a portion positioned at ends of said grip part.

19. The handgrip for a leash according to claim 1, wherein the body of said handgrip is provided with a lock for connecting said releasable connector.

20. The handgrip for a leash according to claim 1, wherein said guiding rail comprises a first end and a second end, a declension being provided at a position in between both said ends, said declension substantially being directed away from said grip part.

* * * * *